US007389127B2

(12) United States Patent
Nomiyama et al.

(10) Patent No.: US 7,389,127 B2
(45) Date of Patent: Jun. 17, 2008

(54) RADIO COMMUNICATION APPARATUS

(75) Inventors: Yasuhiko Nomiyama, Tokyo (JP); Hideto Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 602 days.

(21) Appl. No.: 10/472,480

(22) PCT Filed: Feb. 7, 2002

(86) PCT No.: PCT/JP02/01044

§ 371 (c)(1), (2), (4) Date: Sep. 22, 2003

(87) PCT Pub. No.: WO03/067771

PCT Pub. Date: Aug. 14, 2003

(65) Prior Publication Data

US 2004/0104855 A1 Jun. 3, 2004

(51) Int. Cl.
*H04M 1/00* (2006.01)

(52) U.S. Cl. ....................... 455/562.1; 455/97; 455/25; 455/3.06; 455/575.1

(58) Field of Classification Search ............ 455/562.1, 455/97, 25, 3.06, 575.1, 575.3, 575.9
See application file for complete search history.

(56) References Cited

U.S. PATENT DOCUMENTS

| | | | | | |
|---|---|---|---|---|---|
| 3,671,969 | A | * | 6/1972 | Basman | 342/426 |
| 4,894,663 | A | * | 1/1990 | Urbish et al. | 343/702 |
| 4,939,792 | A | * | 7/1990 | Urbish et al. | 455/347 |
| 5,561,436 | A | * | 10/1996 | Phillips | 343/702 |
| 5,734,716 | A | * | 3/1998 | Kulberg | 379/433.13 |
| 5,797,083 | A | * | 8/1998 | Anderson | 455/25 |
| 5,809,403 | A | * | 9/1998 | MacDonald et al. | 455/575.7 |
| 5,819,185 | A | * | 10/1998 | Umezawa et al. | 455/575.1 |
| 6,091,600 | A | * | 7/2000 | Jeong | 361/680 |
| 6,278,405 | B1 | | 8/2001 | Ha et al. | |
| 6,603,425 | B1 | * | 8/2003 | Woodell | 342/26 R |
| 2002/0147031 | A1 | * | 10/2002 | Hood, III | 455/562 |
| 2003/0080907 | A1 | * | 5/2003 | Wang et al. | 343/713 |

FOREIGN PATENT DOCUMENTS

| | | | | |
|---|---|---|---|---|
| EP | 0 544 050 | A1 | | 6/1993 |
| EP | 0 713 262 | A2 | | 5/1996 |
| JP | 6-53848 | A | | 2/1994 |
| JP | 6-152489 | A | | 5/1994 |
| JP | 6-225230 | A | | 8/1994 |
| JP | 7-283641 | A | | 10/1995 |
| JP | 4-372209 | A | | 12/1995 |
| JP | 9-153850 | A | | 6/1997 |
| JP | 09-261749 | A | | 10/1997 |
| JP | 10-126286 | A | | 5/1998 |
| JP | 11186947 | A | * | 7/1999 |
| JP | 2000-15142 | A | | 5/2000 |
| KR | 2001073841 | A | * | 8/2001 |

* cited by examiner

*Primary Examiner*—Matthew Anderson
*Assistant Examiner*—Minh Dao
(74) *Attorney, Agent, or Firm*—Birch, Stewart, Kolasch & Birch, LLP

(57) ABSTRACT

Short-distance radio communication equipment having a Bluetooth communication feature can maintain a stable reception status by automatically adjusting the reception status of an antenna when the reception status thereof deteriorates.

10 Claims, 10 Drawing Sheets

(a)

(b)

(a)

(b)

(a)

(b)

(a)

(b)

(a)

(b)

RADIO COMMUNICATION APPARATUS

This application is the national phase under 35 U.S.C. § 371 of PCT International Application No. PCT/JP02/01044 which has an International filing date of Feb. 7, 2002, which designated the United States of America.

FIELD OF THE INVENTION

The present invention relates to short-distance radio communication equipment having a so-called Bluetooth communication function of being able to communicate with other communication equipment at a speed of 1 Mbps by using an electric wave of 2.4 GHz band.

BACKGROUND OF THE INVENTION

FIG. 1 is a functional block diagram showing the structure of prior art short-distance radio communication equipment (referred to as radio communication equipment or a main body of radio communication equipment from here on), which is applied to a vehicle-mounted navigation apparatus, for example. In the figure, reference numeral 101 denotes a display for displaying a map screen generated by a navigation apparatus, a TV picture, or the like thereon, reference numeral 102 denotes an operation button for switching among various functions, reference numeral 103 denotes a panel in which the display 101 and the operation button 102 are accommodated, reference numeral 104 denotes an antenna disposed in the radio communication equipment, for sending and receiving electric waves, reference numeral 105 denotes a sending and receiving circuit for encoding and decoding radio signals to be sent and received by way of the antenna 104, reference numeral 106 denotes a microprocessor (abbreviated as a μcomputer from here on) for controlling the radio communication equipment, reference numeral 107 denotes a sound signal processing circuit for processing a sound signal, reference numeral 108 denotes a TV signal processing circuit for processing a TV signal, reference numeral 109 denotes a navigation signal processing circuit for processing a navigation signal, reference numeral 110 denotes a medium drive mechanism for driving a medium (e.g., a DVD-ROM) in which map data for navigation are stored, reference numeral 111 denotes a video signal processing circuit for processing either a map signal from the navigation signal processing circuit 109 or a TV video signal from the TV signal processing circuit 109 based on a control signal from the μcomputer 106, reference numeral 112 denotes a main body of radio communication equipment including the above-mentioned components from the antenna 104 to the video signal processing circuit 111, reference numeral 113 denotes a microphone for collecting sounds so as to generate a sound signal, reference numeral 114 denotes a speaker for reproducing an audio signal or the sound signal, and reference numeral 115 denotes a TV antenna for receiving TV signal electric waves.

Next, a description will be made as to an operation of the prior art main body of radio communication equipment.

FIG. 2 is a flow chart for explaining the operation of the prior art main body of radio communication equipment. In FIGS. 1 and 2, when a user operates the operation button 102, the radio communication equipment searches for the party at the other end of the radio communication connection (in step ST101), and displays the party with which the radio communication equipment can communicate by radio on the display 101 based on the searching result (in step ST102).

When the user then selects the party with which the radio communication equipment will communicate by radio by operating the operation button 102 (in step ST103), the radio communication equipment starts carrying out radio communications with the selected party (in step ST104). When a sound signal generated by the microphone 113 is to be sent out through radio communications, the sound signal is passed through the sound signal processing circuit 107, the μcomputer 106, the sending and receiving circuit 105, and the antenna 104, and is then transmitted to the party at the other end of the radio communication connection. In contrast, a sound signal from the party at the other end of the radio communication connection flows opposite in direction to the travel of the outgoing sound signal from the radio communication equipment and is input to the sound signal processing circuit 107, and a reproduced sound is then output from the speaker 114.

The μcomputer 106 determines whether the user has performed radio communication end operation by pressing the operation button 102 or the sending and receiving circuit has received a radio communication end signal indicating an instruction of ending the communication operation from the party at the other end of the radio communication connection (in step ST105). If YES, the μcomputer 106 ends the radio communication operation.

The TV signal processing circuit 108 processes a TV signal received by the TV antenna 115, and the video signal processing circuit 111 then generates a video signal, which conforms to the display 101, from the processed TV signal from the TV signal processing circuit 108. When the medium drive mechanism 110 reads map data from a medium (e.g., a DVD-ROM), and generates and delivers a map signal for navigation to the navigation signal processing circuit 109, the navigation signal processing circuit 109 processes the map signal and the video signal processing circuit 111 generates a video signal, which conforms to the display 101, from the processed map signal from the navigation signal processing circuit 109.

As previously mentioned, in the prior art short-distance radio communication equipment, the antenna for radio communication is uniquely placed at a position that seems to be a desired one and that is within or outside the equipment regardless of the performance of the party at the other end of the radio communication connection and radio communication environments. A problem encountered with the prior art short-distance radio communication equipment is therefore that when the performance of the party at the other end of the radio communication connection is bad or the radio communication environment is bad, the radio communication environment remains to be bad fixedly and the radio communication equipment cannot maintain the status of radio communication good.

The present invention is proposed to solve the above-mentioned problem, and it is therefore an object of the present invention to provide short-distance radio communication equipment that can notify that the level of received signals from the party at the other end of the radio communication connection is equal to or less than a predetermined value, automatically change the environment specification of an antenna for radio communication, which is disposed within or outside the radio communication equipment, thereby improving the level of received signals from the party at the other end of the radio communication connection and maintaining the status of radio communication good regardless of the performance of the party at the other end of the radio communication connection and the radio communication environment.

DISCLOSURE OF THE INVENTION

Radio communication equipment in accordance with the present invention includes a reception status determining means for determining a received level of a signal received through radio communications, and a radio communication status adjusting means for automatically adjusting a radio communication status so that the radio communication status is optimum according to the received signal level determined by the reception status determining means.

As a result, the radio communication equipment can prevent the received signal level from decreasing due to a change in the position of the party at the other end of communication connection with which the radio communication equipment communicates, and can maintain the communication status good at all times.

Radio communication equipment in accordance with the present invention includes a panel provided with an antenna and tiltably mounted on a main body of radio communication equipment, a reception status determining means for determining a received level of a signal received through radio communications, and a tilting angle adjusting means for, when the received signal level determined by the reception status determining means is equal to or less than a predetermined value, automatically adjusting a tilting angle of the panel so that the received signal level is increased to a maximum.

As a result, the radio communication equipment can prevent the received signal level from decreasing due to a change in the position of the party at the other end of communication connection with which the radio communication equipment communicates, and can maintain the communication status good at all times.

In accordance with the present invention, the panel tiltably mounted on the main body of radio communication equipment is provided with a plurality of antennas having different directivities.

As a result, the radio communication equipment can provide a maximum received signal level by selecting an optimum antenna from among the plurality of antennas having different directivities. Furthermore, by sharpening the directional characteristics (i.e., by selecting a directivity toward a specific direction, i.e., a direction of a transmitting station), the radio communication equipment can significantly communicate with the party that can be placed at a further distance.

Radio communication equipment in accordance with the present invention includes an antenna disposed in a main body of radio communication equipment, a panel tiltably mounted on the main body of radio communication equipment so as to cover the antenna, a reception status determining means for determining a received level of a signal received by the antenna, and a tilting angle adjusting means for, when the received signal level determined by the reception status determining means is equal to or less than a predetermined value, opening the panel so that a front side of the antenna can be viewed from outside the main body of radio communication equipment.

As a result, a radio communication circuit can be placed in the vicinity of the antenna and therefore it becomes easier to design the radio communication equipment. In addition, a good radio communication environment can be established without providing a special specification of the panel.

It is possible to put the radio communication equipment to other uses without any trouble by automatically making the panel that has slid return to its original position after the radio communication ends or the power supply of the radio communication equipment is turned off.

In accordance with the present invention, the radio communication equipment includes an internal antenna disposed in the main body of the radio communication equipment and an external antenna, a reception status determining means for determining a received level of a signal received by the internal antenna, and a display means for, when the received signal level determined by the reception status determining means is equal to or less than a predetermined value, opening the panel so that a front side of the internal antenna can be viewed from outside the main body, and for, when the reception status determining means determines that the received signal level is still equal to or less than the predetermined value after further radio communications are carried out, generating a display screen that urges use of the external antenna.

Even in case of a bad communication environment condition under normal operations, the radio communication equipment can establish a good radio communication environment by using the plurality of antennas that are a received signal level improvement means.

In accordance with the present invention, the radio communication equipment includes a connector disposed in part of the main body of the radio communication equipment, which is not covered by the panel, for connecting with the internal and external antennas.

As a result, because the antennas are not influenced by the opening and closing of the panel, it is not necessary to install a cable for connecting the antennas to the radio communication equipment. In addition, specification conditions required for display and operation of the panel have no relation to the radio communication environment.

In accordance with the present invention, the radio communication equipment includes a stretchable antenna disposed in part of the main body of the radio communication equipment, which is not covered by the panel.

As a result, because the antenna is not influenced by the opening and closing of the panel, it is not necessary to install a cable for connecting the antenna to the radio communication equipment. In addition, specification conditions required for display and operation of the panel have no relation to the radio communication environment. Furthermore, the received signal level can be continuously adjusted according to the amount of expansion or contraction of the stretchable antenna.

PREFERRED EMBODIMENTS OF THE INVENTION

In order to explain the present invention in greater detail, the preferred embodiments will be described below with reference to the accompanying figures.

Embodiment 1

Figure 1:
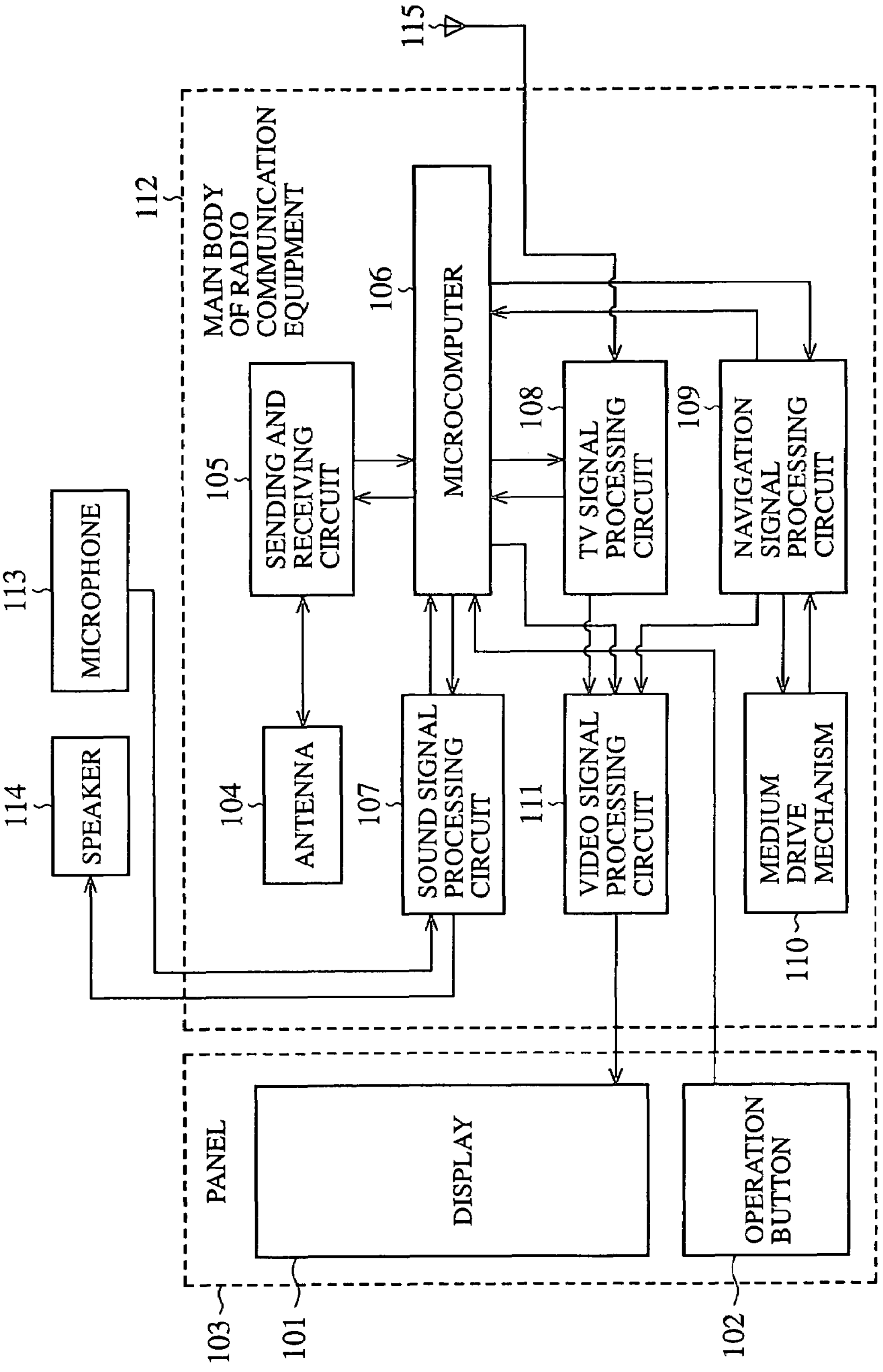
FIG. 1 is a functional block diagram showing the structure of prior art radio communication equipment.
Figure 2:
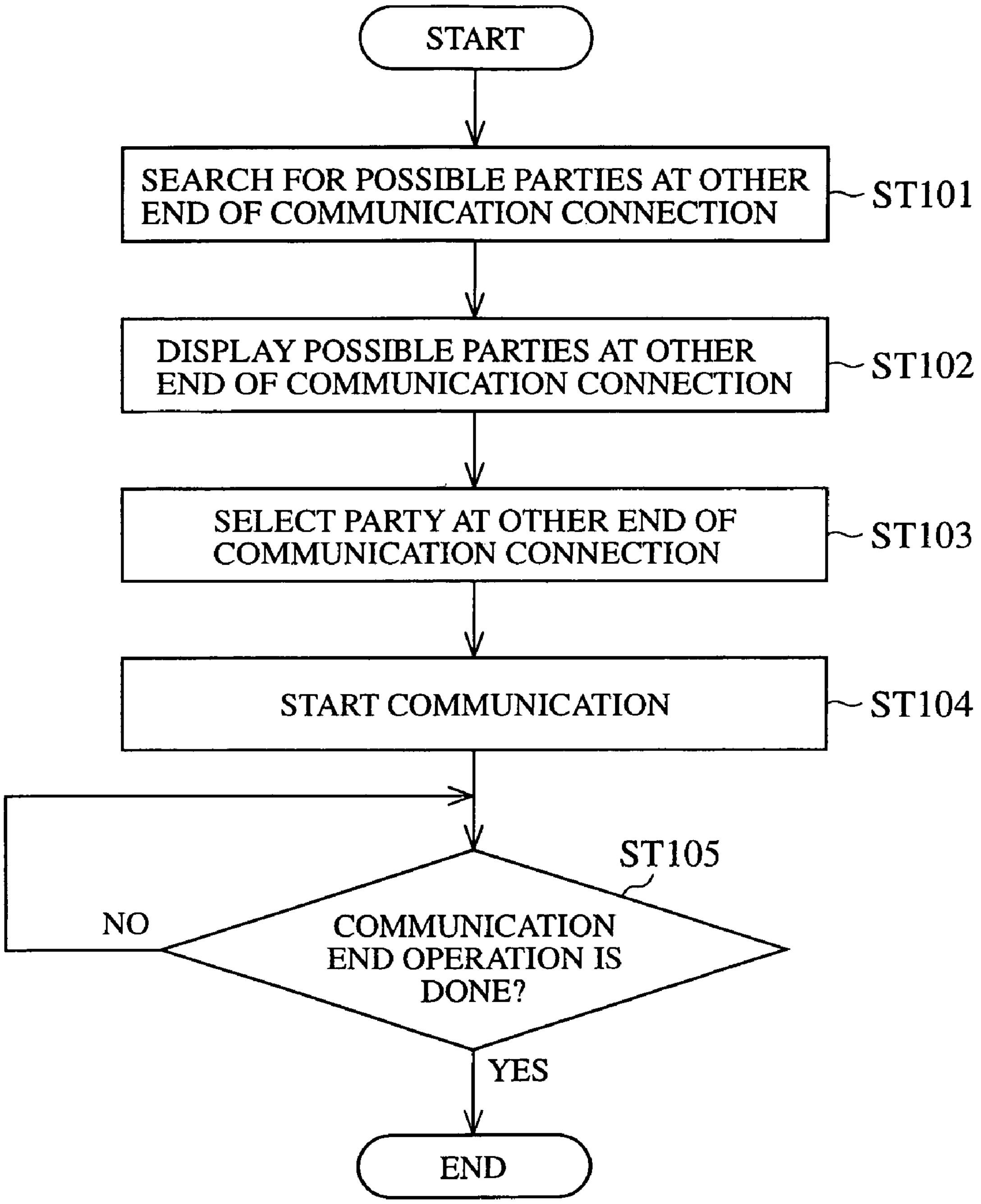
FIG. 2 is a flow chart showing an operation of the prior art radio communication equipment.
Figure 3:
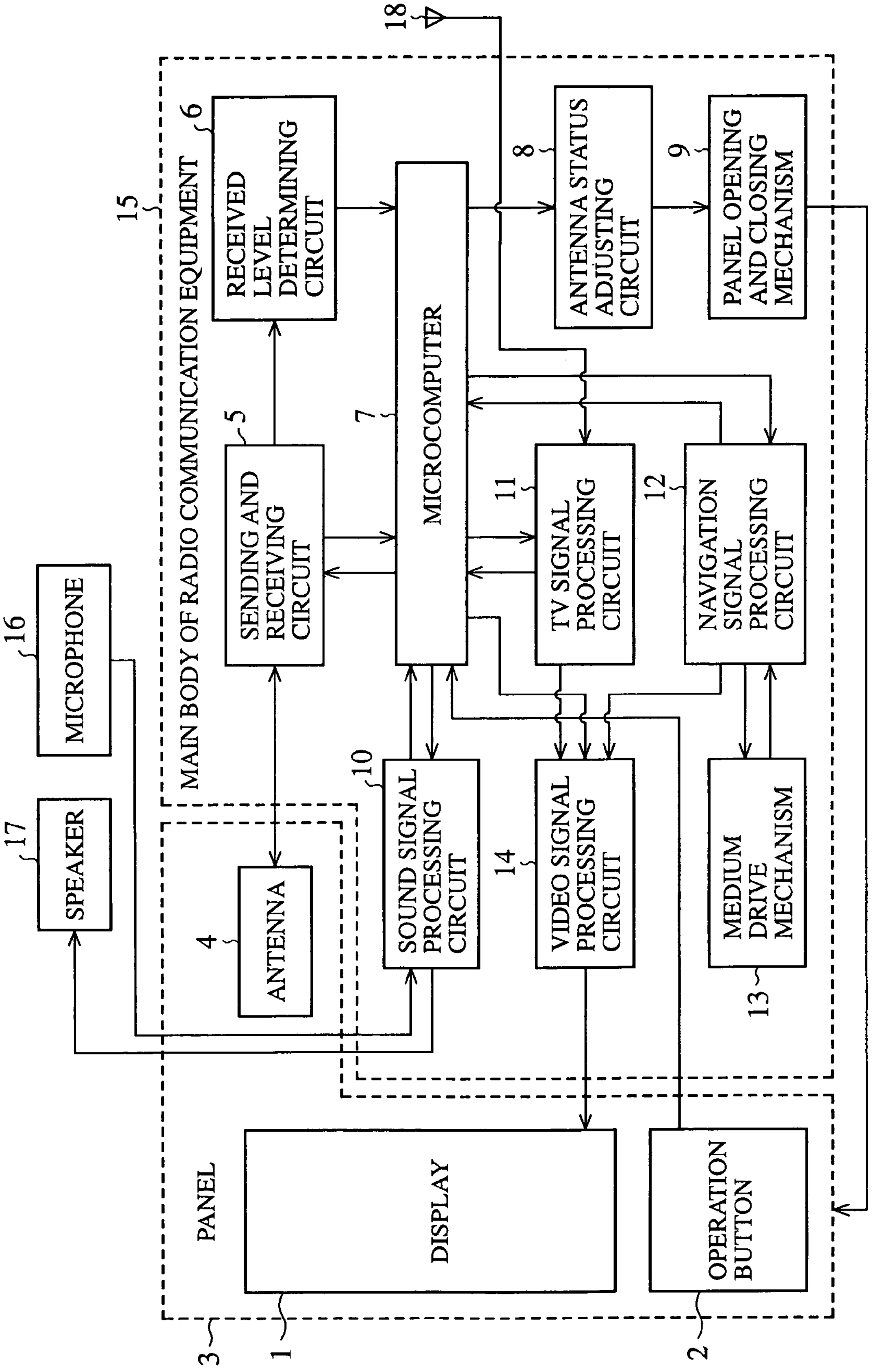
FIG. 3 is a functional block diagram showing the structure of radio communication equipment in accordance with embodiment 1.

FIG. 3 is a functional block diagram showing the structure of radio communication equipment in accordance with embodiment 1 of the present invention, which is applied to a vehicle-mounted navigation apparatus, for example. In FIG. 3, reference numeral 1 denotes a display for displaying a map screen intended for vehicle navigation, a TV picture, or the like thereon, reference numeral 2 denotes an operation button for switching among various functions, reference numeral 4 denotes an antenna for sending and receiving electric waves through radio communications, reference numeral 3 denotes a panel in which the display 1, the operation button 2, and the antenna 4 are accommodated, reference numeral 5 denotes a sending and receiving circuit for encoding and decoding radio signals to be sent and received byway of the antenna 4, reference numeral 6 denotes a received level determining circuit (i.e., a reception status determining means) for measuring the received level of a received electric wave, and for determining whether or not the received signal level is greater than a predetermined value, reference numeral 7 denotes a μcomputer (i.e., a radio communication status adjusting means) for controlling the radio communication equipment, reference numeral 8 denotes an antenna status adjusting circuit (i.e., the radio communication status adjusting means) for adjusting the position and direction of the antenna, reference numeral 9 denotes a panel opening and closing mechanism (i.e., a tilting angle adjusting means) for opening and closing the panel 3, reference numeral 10 denotes a sound signal processing circuit for processing a sound signal, reference numeral 11 denotes a TV signal processing circuit for processing a TV signal, reference numeral 12 denotes a navigation signal processing circuit for processing a navigation signal, reference numeral 13 denotes a medium drive mechanism for driving a medium (e.g., a DVD-ROM) in which map data used for vehicle navigation are stored, reference numeral 14 denotes a video signal processing circuit for processing either a map signal from the navigation signal processing circuit 12 or a TV picture signal from the TV signal processing circuit 11 based on a control signal from the μcomputer 7, reference numeral 15 denotes a main body of radio communication equipment including the above-mentioned components from the sending and receiving circuit 5 to the video signal processing circuit 14, reference numeral 16 denotes a microphone for collecting sounds so as to generate a sound signal, reference numeral 17 denotes a speaker for reproducing an audio signal or the sound signal, and reference numeral 18 denotes a TV antenna for receiving TV signal electric waves.

Next, a description will be made as to an operation of the radio communication equipment in accordance with embodiment 1 of the present invention.

Figure 4:
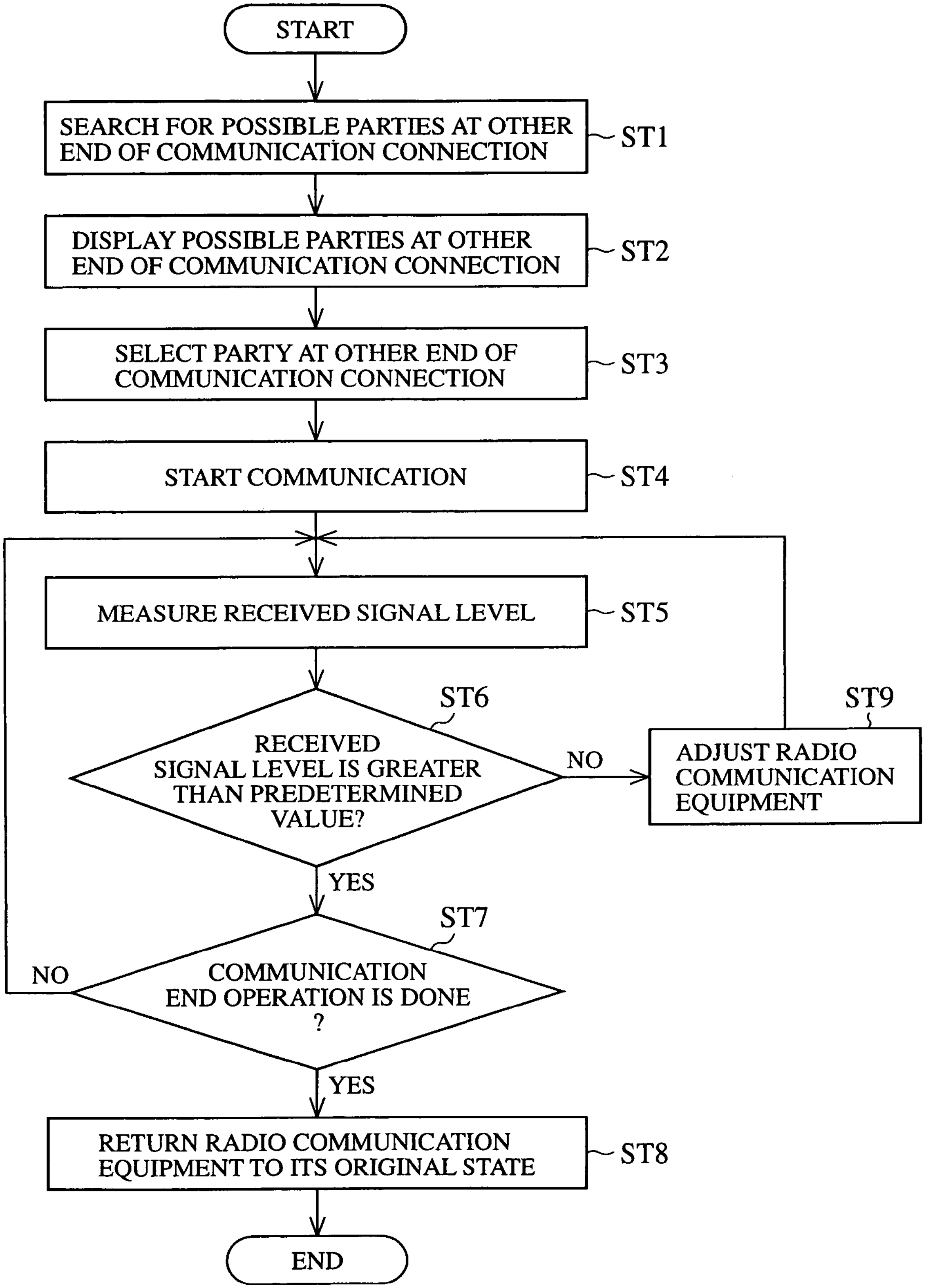
FIG. 4 is a flow chart showing an operation of the prior art radio communication equipment in accordance with embodiment 1.

FIG. 4 is a flow chart for explaining the operation of the radio communication equipment. In FIGS. 3 and 4, when a user operates the operation button 2, the radio communication equipment searches for one or more possible parties at the other end of radio communication connection (in step ST1), and displays the one or more possible parties with which the radio communication equipment can communication by radio on the display 1 based on the searching result (in step ST2).

When the user then selects a desired party with which the radio communication equipment will communicate by radio by operating the operation button 2 (in step ST3), and the radio communication equipment starts carrying out radio communications with the selected party (in step ST4). When receiving a signal sent from the party at the other end of the radio communication connection by way of the antenna 4, the radio communication equipment decodes the received signal by using the sending and receiving circuit 5 and determines whether or not the level of the decoded received signal is greater than a predetermined value by using the received level determining circuit 6 (in step ST5). The radio communication equipment then delivers the determination result to the μcomputer 7 so as to check to see whether the determination result shows that the signal level of the decoded received signal is greater than the predetermined value (in step ST6), and further determines whether the radio communication processing has been finished when the determination result shows that the level of the decoded received signal is greater than the predetermined value (i.e., if YES as the result of performing ST6) (in step ST7). When the radio communication processing has not yet been finished (i.e., if NO as the result of performing step ST7), the radio communication equipment returns to step ST5 in which it repeats the measurement of the received signal level.

When the determination result of step ST6 shows that the measured received signal level is equal to or less than the predetermined value (i.e., if NO as the result of performing step ST6), the radio communication equipment carries out radio communication equipment adjustment (i.e., adjustment of a tilting angle of the panel 3 with respect to the main body 15 of radio communication equipment) (in step ST9). After adjusting the tilting angle of the panel 3 with respect to the main body 15, the radio communication equipment returns to step ST5 in which it measures the received signal level again. The radio communication equipment then, in step ST6, determines again whether or not the received signal level is greater than the predetermined value.

When a sound signal generated by the microphone 16 is to be sent out through radio communications, the sound signal is passed through the sound signal processing circuit 10, the μcomputer 7, the sending and receiving circuit 5, and the antenna 4, and is then transmitted to the party at the other end of the radio communication connection. In contrast, a sound signal from the party at the other end of the radio communication connection flows opposite in direction to the travel of the outgoing sound signal from the radio communication equipment and is then input to the sound signal processing circuit 10, and a reproduced sound is output from the speaker 17.

The μcomputer 7, in above-mentioned step ST7, determines whether the user has performed a radio communication end operation by operating the operation button 2 or the sending and receiving circuit 5 has received a radio communication end signal indicating an instruction of ending the radio communication processing from the party at the other end of the radio communication connection. If YES as the result of performing step ST7, the μcomputer 7 returns the radio communication equipment to its original state (in step ST8), and then ends the sequence of radio communication operations.

The TV signal processing circuit 11 processes a TV signal received by the TV antenna 18, and the video signal processing circuit 14 then generates a video signal, which conforms to the display 1, from the processed TV signal from the TV signal processing circuit 11. When the medium drive mechanism 13 reads map data from a medium such as a DVD-ROM, and generates and delivers a map signal used for vehicle navigation to the navigation signal processing circuit 12, the navigation signal processing circuit 12 processes the map signal and the video signal processing circuit 14 generates a video signal which conforms to the display 1, from the processed map signal from the navigation signal processing circuit 12.

Embodiment 2.

Figure 5:
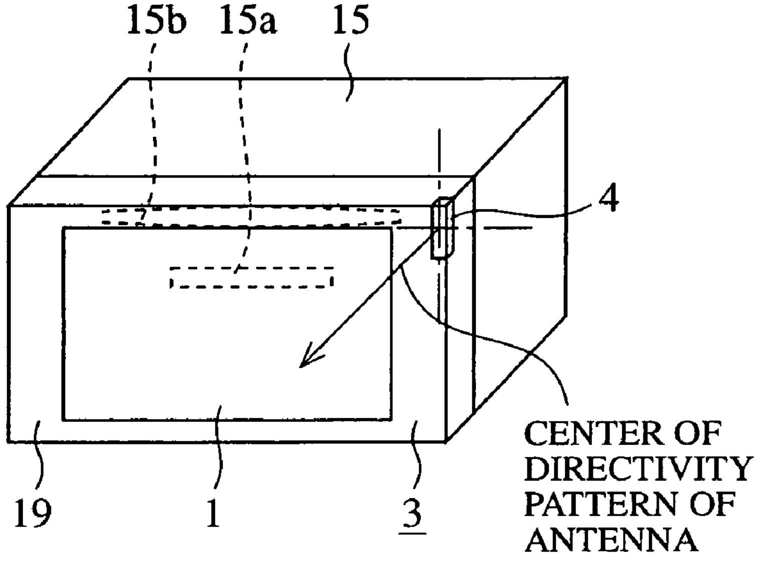
FIG. 5 is an external view showing radio communication equipment in accordance with embodiment 2.
Figure 5:
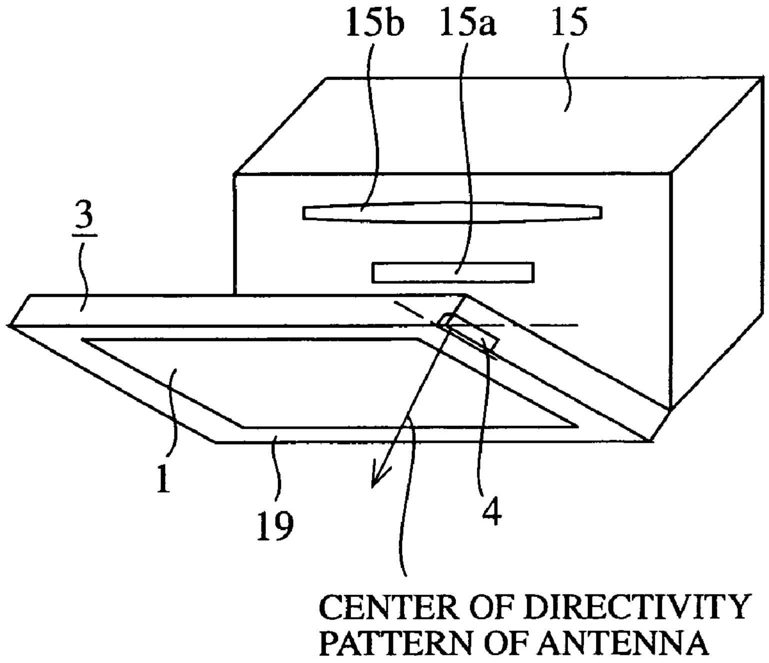

FIG. 5 is an explanatory drawing showing the structure of a main body 15 of radio communication equipment in which an antenna 4 for sending and receiving electric waves for radio communication is mounted. For example, an insertion opening 15*a* for cassette tapes and an insertion opening 15*b* for CDs are disposed in a front surface of the main body 15 of radio communication equipment. A lower edge of a panel 3 accommodating a display 1 in a frame 19 thereof is attached to the main body 15 of radio communication equipment by way of a hinge (not shown in the figure), for example, so that the panel 3 can cover the insertion openings 15*a* and 15*b* and can be opened and closed.

When the central direction of the directivity pattern of the antenna 4 for radio communication accommodated in the opening and closing panel 3 mounted on the main body 15 of radio communication equipment is oriented in a direction of the front of the main body 15, the directivity pattern roughly confronts mobile equipment (not shown in the figure), which is put in a driver's breast pocket, for example, and good conditions must be therefore satisfied when the radio communication equipment communicates by radio with this mobile equipment (see FIG. 5(*a*)).

On the other hand, when the mobile equipment is located on a passenger's seat or in a bag put under the passenger's seat, the direction of the directivity pattern of the antenna 4 is not necessarily ideal.

In this case, the radio communication equipment causes the panel opening and closing mechanism 9 to work based on an output signal of an antenna status adjusting circuit 8 that runs from an output of a μcomputer 7 that has processed an output of a received level determining circuit 6. A panel opening and closing mechanism 9 then tilts the panel 3 in a slightly-downward direction so that the directivity pattern of the antenna 4 is inclined in a direction of where the mobile equipment is located. As a result, the radio-communication equipment can provide a good condition for radio communications (see FIG. 5(*b*)).

The radio communication equipment can display the status of signals received from the party with which the radio communication equipment communicates by radio on the display 1 mounted in the panel 3. When the panel 3 moves, the radio communication equipment can also display the fact that the panel 3 moves on the display 1. As previously mentioned, the radio communication equipment can automatically adjust a tilting angle of the panel 3 attached to the main body 15 of radio communication equipment so that the panel 3 is oriented in a slightly-downward direction by activating the panel opening and closing mechanism 9 based on the output of the received level determining circuit 6 that determines the level of signals received from the party with which the radio communication equipment communicates by radio.

Embodiment 3.

Figure 6:
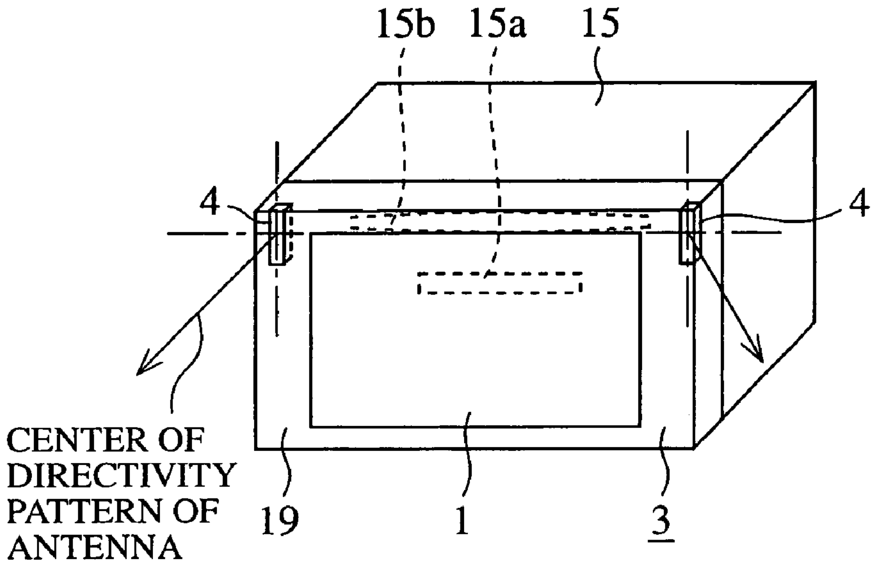
FIG. 6 is an external view showing radio communication equipment in accordance with embodiment 3.
Figure 6:
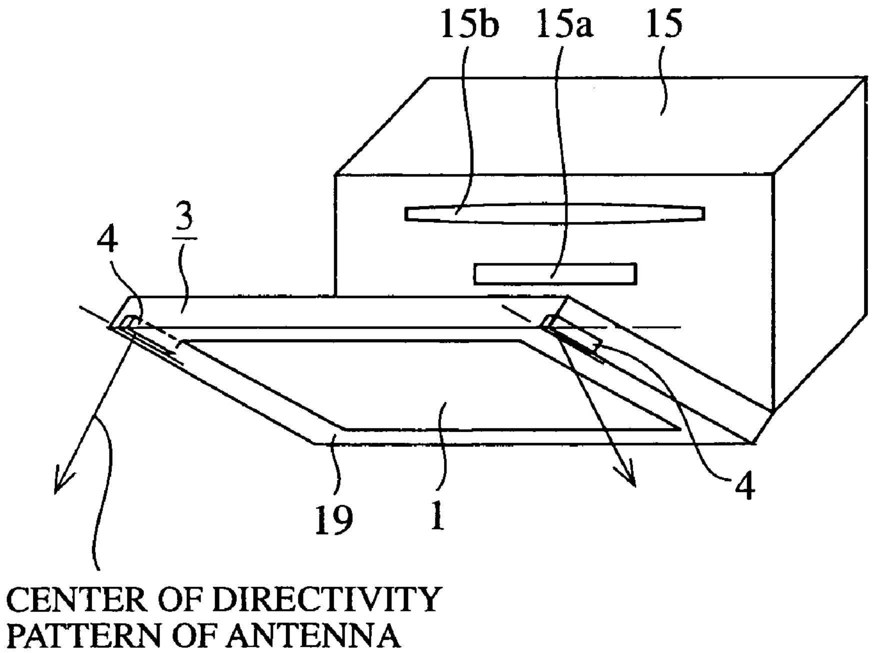

FIG. 6 is an explanatory drawing showing the structure of a main body 15 of radio communication equipment in which an antenna 4 for sending and receiving electric waves for radio communication is mounted. The main body 15 of radio communication equipment is the one that is provided as an extension of that in accordance with embodiment 2 shown in FIG. 5, and is provided with two antennas 4 built in a panel 3 and having directivity patterns whose central directions are different from each other. FIG. 6(*a*) is a state diagram showing the panel 3 which is closed, and FIG. 6(*b*) is a state diagram showing the panel 3 which is opened and inclined in a slightly-downward direction.

Either a method of selectively using one of the two antennas 4 with a higher received signal level or a method of using the two antennas 4 and combining the levels of signals received by the two antennas 4 can be adopted. Consequently, the radio communication equipment can finely adjust a tilting angle of the panel with respect to the main body 15 of radio communication equipment according to the position of the party with which the radio communication equipment communicates by radio.

Embodiment 4.

Figure 7:
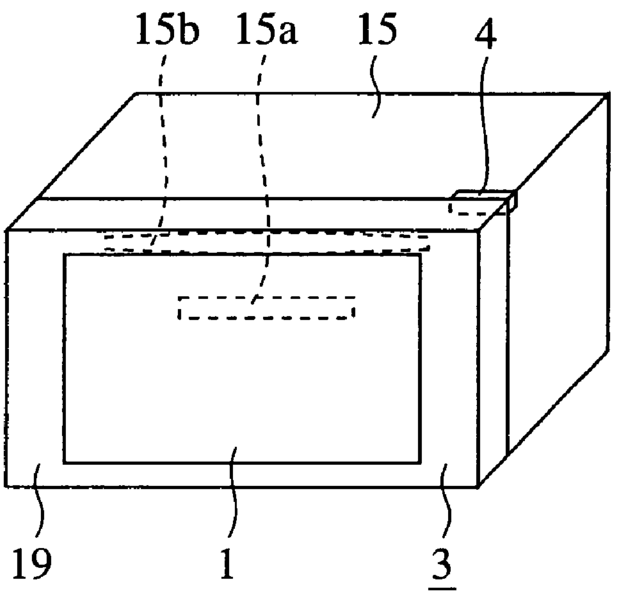
FIG. 7 is an external view showing radio communication equipment in accordance with embodiment 4.
Figure 7:
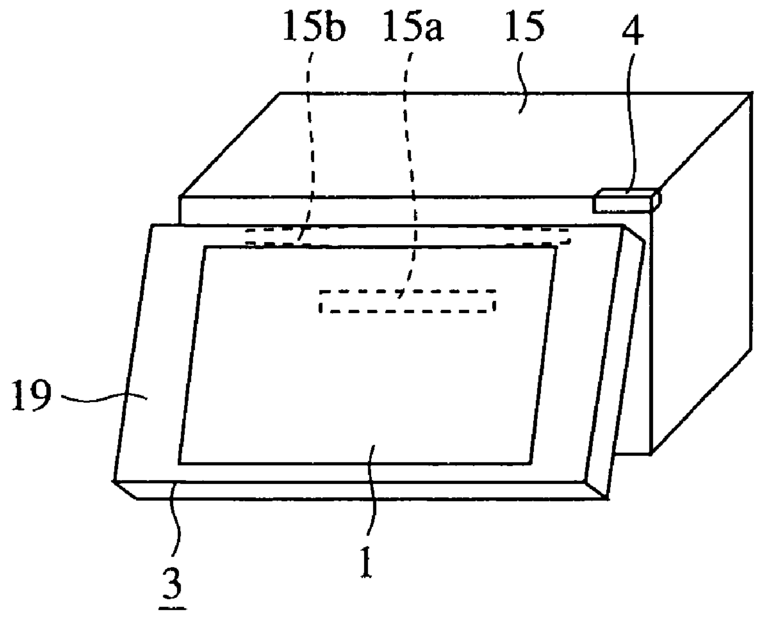

FIG. 7 is an explanatory drawing showing the structure of a main body of radio communication equipment in which an antenna 4 for sending and receiving electric waves for radio communication is mounted. A panel 3 is slidably attached to a front side of the radio communication equipment 15 so that the panel can be opened or closed, and an antenna 4 is disposed in the main body of radio communication equipment so that it can be covered by the panel 3 when the panel is closed. The radio communication equipment in accordance with this embodiment 4 differs from the radio communication equipment in accordance with embodiment 2 as shown in FIG. 5 in that the antenna 4 is disposed in the main body 15 of radio communication equipment, and the other components of the radio communication equipment in accordance with embodiment 4 are the same as those of the radio communication equipment in accordance with embodiment 2.

Under normal conditions, the radio communication equipment carries out radio communications with the panel 3 being closed, as shown in FIG. 7(*a*). When the level of signals received from the party at the other end of radio communication connection decreases, the radio communication equipment automatically makes the panel 3 slightly slide, as shown in FIG. 7(*b*), so that a front side of the antenna 4 can be viewed from outside the main body of radio communication equipment and send/receive signals can be easily passed through the panel. Because the radio communication equipment makes the panel 3 slightly slide, the user can see information displayed on the display 1 in the panel 4 as before even in this state.

Embodiment 5.

Figure 8:
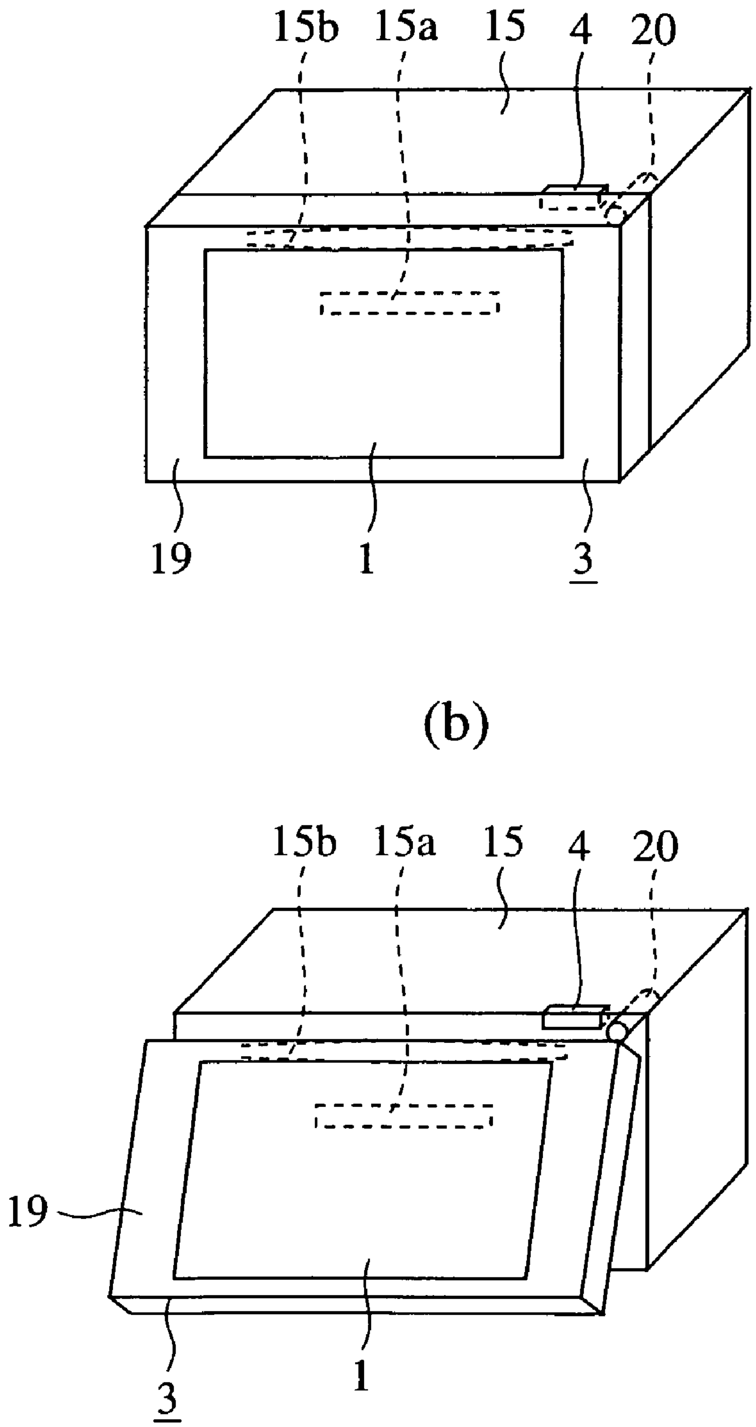
FIG. 8 is an external view showing radio communication equipment in accordance with embodiment 5.

FIG. 8 is an explanatory drawing showing the structure of a main body of radio communication equipment in which an antenna 4 for sending and receiving electric waves for radio communication is mounted. The main body of radio communication equipment is the one that is provided as an extension of that in accordance with embodiment 4 shown in FIG. 7. In this embodiment 5 , as shown in FIGS. 8(*a*) and 8(*b*), when the deterioration of the received signal level is not improved even though the radio communication equipment automatically makes a panel 3 slide based on a result of determination from a received level determining circuit 6 so that the panel 3 is slightly opened with respect to the main body 15 of radio communication equipment, the radio communication equipment allows the user to connect an external antenna (not shown in the figure) with a connector 20 disposed in the main body 15 of radio communication equipment, so that the user can place the external antenna at an optimum position where the received signal level is improved and the radio communication equipment can properly carry out radio communications.

Embodiment 6.

Figure 9:
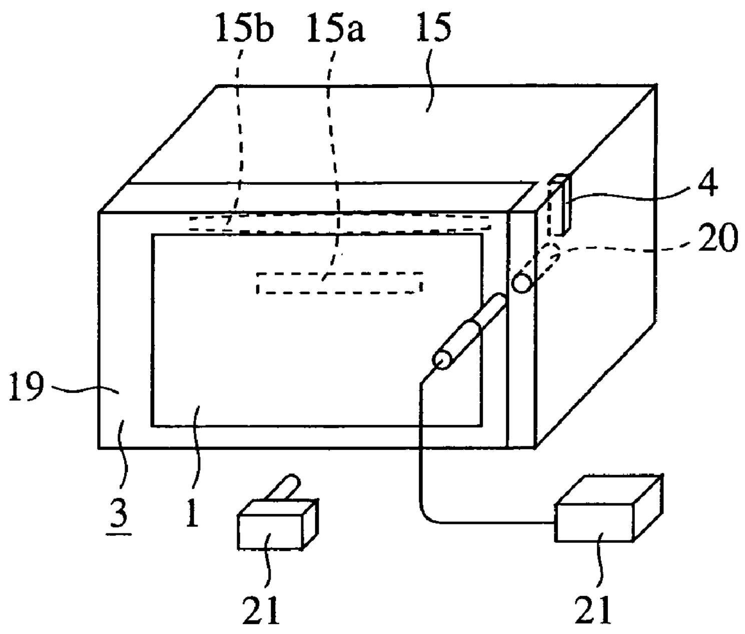
FIG. 9 is an external view showing radio communication equipment in accordance with embodiment 6.
Figure 9:
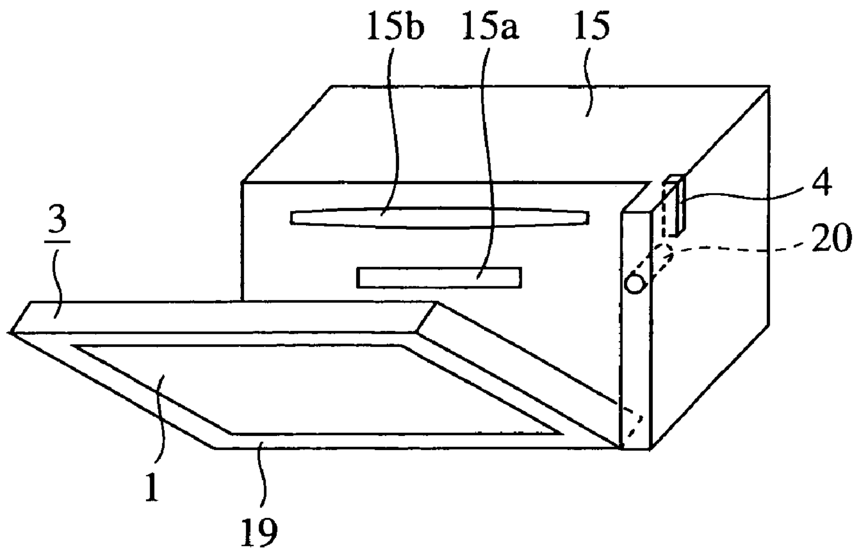

FIG. 9 is an explanatory drawing showing the structure of a main body 15 of radio communication equipment in which an antenna 4 for sending and receiving electric waves for radio communication is mounted. In accordance with this embodiment, a panel 3 is so formed as to have a size smaller than a size of a front side of the main body 15 of radio communication equipment.

Under normal conditions, the radio communication equipment carries out radio communications by way of the antenna 4 built in the main body 15 of radio communication equipment, as shown in FIG. 9(*a*). When the level of signals received, by way of the antenna 4, from the party at the other end of radio communication connection decreases, the radio communication equipment allows the user to connect an external antenna 21*a* (or 21*b*) with a connector 20 disposed in a main body 15 of radio communication equipment, which is not covered by the panel 3, so that the user can place the external antenna 21 at an optimum position where the received signal level is improved and the radio communication equipment can properly carry out radio communications. Thus, in accordance with embodiment 6 of FIG. 9, an improvement in the received signal level can be obtained regardless of opening or closing of the panel 3 with respect to the main body 15 of radio communication equipment. When attaching or detaching a cassette tape or CD to or from the main body 15 of radio communication equipment, for example, the panel 3 is opened as shown in FIG. 9(*b*).

Embodiment 7.

Figure 10:
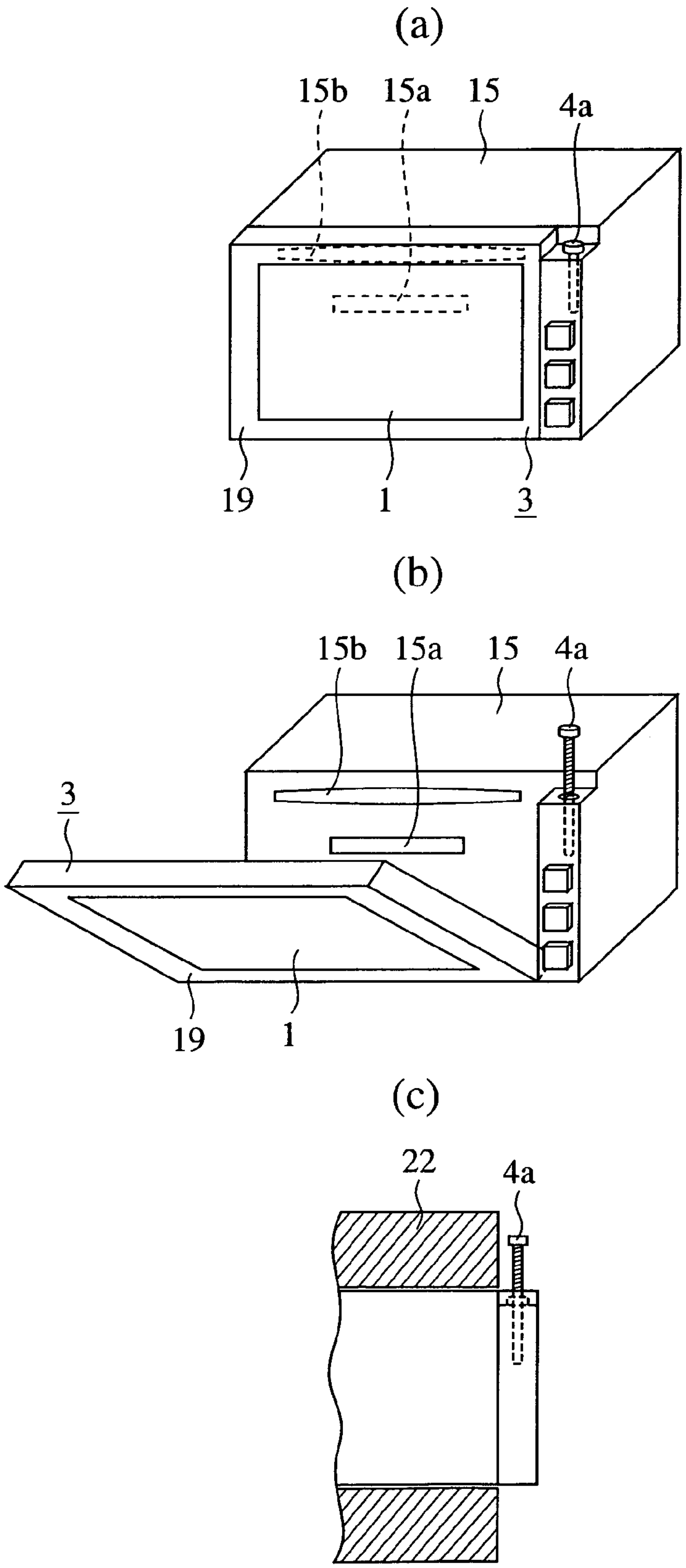
FIG. 10 is an external view showing radio communication equipment in accordance with embodiment 7.

FIG. 10 is an explanatory drawing showing the structure of a main body 15 of radio communication equipment in which an antenna 4 for sending and receiving electric waves for radio communication is mounted. This embodiment 7 is another example in which a panel 3 is so formed as to have a size smaller than a size of a front side of the main body 15 of radio communication equipment. In accordance with this embodiment 7, a stretchable antenna 4*a* is placed in the main body 15 of radio communication equipment in the vicinity of a lateral side of the panel 3, as shown in FIG. 10(*a*).

Under normal conditions, the radio communication equipment carries out radio communications with the stretchable antenna 4*a* being contracted, as shown in FIG. 10(*a*). When the received signal level decreases, the radio communication equipment allows the user to extend the antenna 4*a*, as shown in FIG. 10(*b*), based on a detection signal indicating the deterioration of the received signal level or operates a driving unit for driving the antenna, such as a motor (not shown in the figure), so as to automatically extend the stretchable antenna 4*a*, thereby improving the received signal level. In order to install the main body 15 of radio communication equipment in a vehicle, no trouble will occur due to the extending or contracting of the antenna 4*a* when the antenna 4*a* is simply mounted such that it is prevented from hitting such an element 22 of the vehicle as shown in FIG. 10(*c*). When attaching or detaching a cassette tape or CD to or from the main body 15 of radio communication equipment, for example, the panel 3 is opened as shown in FIG. 10(*b*).

As previously mentioned, in accordance with either of above-mentioned embodiments, the radio communication equipment of the present invention is applied to a vehicle-mounted navigation apparatus whose receiving status changes as the vehicle moves. The radio communication equipment of the present invention can be similarly applied to a TV set whose receiving status changes when it is moved to another installation place or when TV channel switching or the like is carried out.

INDUSTRIAL APPLICABILITY

As mentioned above, the radio communication equipment in accordance with the present invention is suitable for obtaining an improvement in the performance of short-distance radio communication equipment having a so-called Bluetooth communication function.

The invention claimed is:

1. Radio communication equipment comprising:

a panel provided with an antenna and tiltably mounted on a main body of radio communication equipment;

a reception status determining means for determining a received level of a signal received through radio communications; and a tilting angle adjusting device for, when the received signal level determined by said reception status determining means is equal to or less than a predetermined value, automatically adjusting a tilting angle of said panel so that the received signal level is increased.

2. The radio communication equipment according to claim 1, wherein said panel is provided with a plurality of antennas having different directivities.

3. The radio communication equipment according to claim 1, wherein the reception status determining device determines the received level of a signal in the Industrial, Scientific, and Medical (ISM) bands, the ISM signal being received through said radio communications.

4. The radio communication equipment according to claim 3, wherein said radio communication equipment is configured to conduct the radio communications using Bluetooth communication functions.

5. Radio communication equipment comprising:

an antenna disposed in a main body of radio communication equipment;

a panel tiltably mounted on said main body of radio communication equipment so as to cover said antenna;

a reception stats determining device for determining a received level of a signal received by said antenna; and an adjusting device for, when the received signal level determined by said reception status determining device is equal to or less than a predetermined value, automatically opening said panel so that a front side of said antenna can be viewed from outside said main body of radio communication equipment.

6. The radio communication equipment according to claim 5, wherein said equipment further includes an external antenna, and a display for, when the received signal level determined by said reception status determining device is equal to or less than a predetermined value, opening said panel so that a front side of said internal antenna can be viewed from outside said main body, and for, when said reception status determining device determines that the received signal level is still equal to or less than the predetermined value after further radio communications are carried out, generating a display screen that urges use of said external antenna.

7. The radio communication equipment according to claim 6, wherein said equipment includes a connector disposed in part of said main body of said radio communication equipment, which is not covered by said panel, for connecting with said external antenna.

8. The radio communication equipment according to claim 6, wherein said equipment includes a stretchable antenna disposed in part of said main body of said radio communication equipment, which is not covered by said panel.

9. The radio communication equipment according to claim 5, wherein the reception status determining device determines the received level of a signal in the Industrial, Scientific, and Medical (ISM) bands, the ISM signal being received through said radio communications.

10. The radio communication equipment according to claim 9, wherein said radio communication equipment is configured to conduct the radio communications using Bluetooth communication functions.

* * * * *

UNITED STATES PATENT AND TRADEMARK OFFICE

CERTIFICATE OF CORRECTION

PATENT NO. : 7,389,127 B2
APPLICATION NO. : 10/472480
DATED : June 17, 2008
INVENTOR(S) : Yasuhiko Nomiyama et al.

It is certified that error appears in the above-identified patent and that said Letters Patent is hereby corrected as shown below:

In Claim 5, column 10, line 60, change “a reception stats determining device” to --a reception status determining device--.

Signed and Sealed this

Twenty-third Day of December, 2008

JON W. DUDAS
*Director of the United States Patent and Trademark Office*